(12) United States Patent
Bartnick

(10) Patent No.: US 8,307,516 B2
(45) Date of Patent: Nov. 13, 2012

(54) ASSIST HANDLE SPRING DESIGN FOR CONSTANT RETURN VELOCITY

(75) Inventor: Brian K. Bartnick, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 12/725,550

(22) Filed: Mar. 17, 2010

(65) Prior Publication Data

US 2011/0225771 A1 Sep. 22, 2011

(51) Int. Cl.
*E05B 7/00* (2006.01)
(52) U.S. Cl. .......... 16/438; 16/445; 16/110.1; 296/1.02
(58) Field of Classification Search .......... 16/429, 16/110.1, 412, 413, 415, 419, 420, 426, 427, 16/430, 436, 438, 443, 444, 445, 446, 291, 16/293, DIG. 24; 296/1.02
See application file for complete search history.

(56) References Cited

U.S. PATENT DOCUMENTS

| | | | |
|---|---|---|---|
| 5,625,921 A | 5/1997 | Smith | |
| 5,855,408 A * | 1/1999 | Rickabus | 16/429 |
| 5,975,606 A | 11/1999 | Forbes et al. | |
| 5,991,976 A * | 11/1999 | Adams et al. | 16/444 |
| 6,397,435 B1 | 6/2002 | Gosselet | |
| 6,643,897 B2 * | 11/2003 | Chang | 16/438 |
| 6,715,813 B2 * | 4/2004 | Thompson et al. | 16/438 |
| 6,836,932 B2 | 1/2005 | Yamamoto et al. | |
| 7,103,939 B2 | 9/2006 | Belchine, III et al. | |
| 7,617,571 B2 | 11/2009 | Lee et al. | |
| 8,146,208 B2 * | 4/2012 | Kajio et al. | 16/444 |
| 2002/0020042 A1 | 2/2002 | Kurachi et al. | |
| 2003/0074767 A1 | 4/2003 | Chang | |
| 2003/0226240 A1 * | 12/2003 | Belchine, III | 16/438 |
| 2004/0036304 A1 * | 2/2004 | Thompson et al. | 16/438 |
| 2005/0091798 A1 * | 5/2005 | Belchine et al. | 16/412 |
| 2009/0079233 A1 * | 3/2009 | Hidaka et al. | 16/445 |

* cited by examiner

*Primary Examiner* — Jeffrey O Brien
(74) *Attorney, Agent, or Firm* — Quinn Law Group, PLLC

(57) ABSTRACT

An assist handle assembly for a vehicle includes a body and at least a first hinge assembly rotatably coupled to the body. A primary spring interconnects the body and the first hinge assembly and biases the body from an open position into a stowed position. A secondary spring interconnects the body and the first hinge assembly, and biases against the primary spring when the body is between the open position and an intermediate position to resist rotation of the body into the stowed position, and biases with the primary spring when the body is between the intermediate position and the stowed position to assist rotation of the body into the stowed position.

20 Claims, 4 Drawing Sheets

ASSIST HANDLE SPRING DESIGN FOR CONSTANT RETURN VELOCITY

TECHNICAL FIELD

The invention generally relates to an assist handle assembly for aiding passenger ingress and/or egress to and/or from a passenger compartment of a vehicle.

BACKGROUND OF THE INVENTION

Some vehicles include assist handles disposed on an interior of a passenger compartment of the vehicle. A passenger may grasp the assist handle to aid in ingress and/or egress to and/or from the passenger compartment of the vehicle.

Some assist handle assemblies include a spring powered retractable handle. The handle automatically retracts out of the way into a stowed position when not in use. For use, the passenger grasps the handle and pulls the handle to an open position, at which time the passenger may leverage against the assist handle to aid in ingress and/or egress. Upon releasing the handle, a spring automatically biases the handle back into the stowed position. The assist handle may include a damper to slow the return of the handle back into the stowed position, thereby preventing the handle from quickly "snapping" back into the stowed position.

Typically, the spring that biases the handle back into the stowed position includes a torsion spring, e.g., a wound coil that stores energy when a torque is applied. However, torsion springs do not exhibit a uniform torque curve. For example, torsion springs provide more power when storing larger amounts of torque than when storing lesser amounts of torque. Accordingly, as the torsion spring unwinds, the power provided by the torsion spring decreases. As such, the torsion spring provides a higher power output when in the open position, and lower power output when in the stowed position.

Therefore, the torsion springs used in assist handles are sized to provide minimal power when the handle is in the stowed position to minimize the "snapping" of the handle. When so sized, the torsion springs tend to provide excessive power when the handle is in the open position. When used in combination with the damper, torque losses from the damper, especially if the torsion spring weakens over time, may reduce the available torque from the torsion spring to a level insufficient to fully return the handle back to the stowed position, commonly referred to as a "lazy handle".

SUMMARY OF THE INVENTION

An assist handle assembly for a vehicle is provided. The assist handle assembly includes a body. A first hinge assembly is coupled to the body. The body is rotatable between a stowed position and an open position. The body rotates about a pivot axis relative to the first hinge assembly. A primary spring interconnects the body and the first hinge assembly. The primary spring is configured for biasing the body into the stowed position. A secondary spring interconnects the body and the first hinge assembly. The secondary spring is configured for biasing the body into the open position when the body is disposed within a first range of motion between the stowed position and the open position, and for biasing the body into the stowed position when the body is disposed within a second range of motion between the stowed position and the open position.

In another aspect of the invention, an assist handle assembly for a vehicle is provided. The assist handle assembly includes a body having a first end portion and a second end portion. The first end portion and the second end portion are disposed at opposite ends of the body. A first hinge assembly is coupled to the first end portion. A second hinge assembly is coupled to the second end portion. The body is rotatable between a stowed position and an open position. The body rotates about a pivot axis relative to the first hinge assembly and the second hinge assembly. A primary spring interconnects the body and one of the first hinge assembly and the second hinge assembly. The primary spring is configured for biasing the body into the stowed position. A secondary spring interconnects the body and one of the first hinge assembly and the second hinge assembly. The secondary spring is configured for biasing the body into the open position when the body is disposed within a first range of motion between the stowed position and the open position, and is also configured for biasing the body into the stowed position when the body is disposed within a second range of motion between the stowed position and the open position.

In another aspect of the invention, an assist handle assembly for a vehicle is provided. The assist handle assembly includes a body having a first end portion and a second end portion. The first end portion and the second end portion are disposed at opposite ends of the body. A first hinge assembly is coupled to the first end portion. A second hinge assembly is coupled to the second end portion. The body is rotatable between a stowed position and an open position. The body rotates about a pivot axis relative to the first hinge assembly and the second hinge assembly. A damper interconnects the body and one of the first hinge assembly and the second hinge assembly. The damper is configured for slowing rotation of the body. A primary spring interconnects the body and one of the first hinge assembly and the second hinge assembly. The primary spring is configured for biasing the body into the stowed position. The primary spring includes a torsion spring. A secondary spring interconnects the body and one of the first hinge assembly and the second hinge assembly. The secondary spring is configured for biasing the body into the open position when the body is disposed within a first range of motion between the stowed position and the open position, and is also configured for biasing the body into the stowed position when the body is disposed within a second range of motion between the stowed position and the open position. The first range of motion includes rotation of the body between the open position and an intermediate position, which is disposed between the open position and the stowed position. The second range of motion includes rotation of the body between the stowed position and the intermediate position. The secondary spring biases against the primary spring during the first range of motion to resist rotation of the body from the open position into the intermediate position. The secondary spring biases with the primary spring during the second range of motion to assist rotation of the body from the intermediate position into the stowed position. The secondary spring includes a scissor spring. The scissor spring includes a first end attached to the body and a second end attached to one of the first hinge assembly and the second hinge assembly.

Accordingly, the secondary spring of the assist handle assembly biases against the primary torsion spring when the body is in or near the open position and the primary torsion spring includes its highest power output to reduce the torque applied to the damper and slow rotation of the body. Additionally, the secondary spring of the assist handle assembly biases with the primary torsion spring when the body is in or near the stowed position and the primary torsion spring includes its lowest power output to increase the torque applied to the damper and speed rotation of the body to ensure complete return of the body to the closed position. Therefore, the secondary spring of the assist handle assembly meters the speed of return of the body to provide a constant velocity return from the open position to the stowed position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the Figures, wherein like numerals indicate like parts throughout the several views, an assist handle assembly is shown generally at 20. The assist handle assembly 20 is disposed in an interior of a passenger compartment of the vehicle. A passenger may grasp the assist handle assembly 20 to aid in ingress and/or egress to and/or from the passenger compartment of the vehicle.

Figure 1:
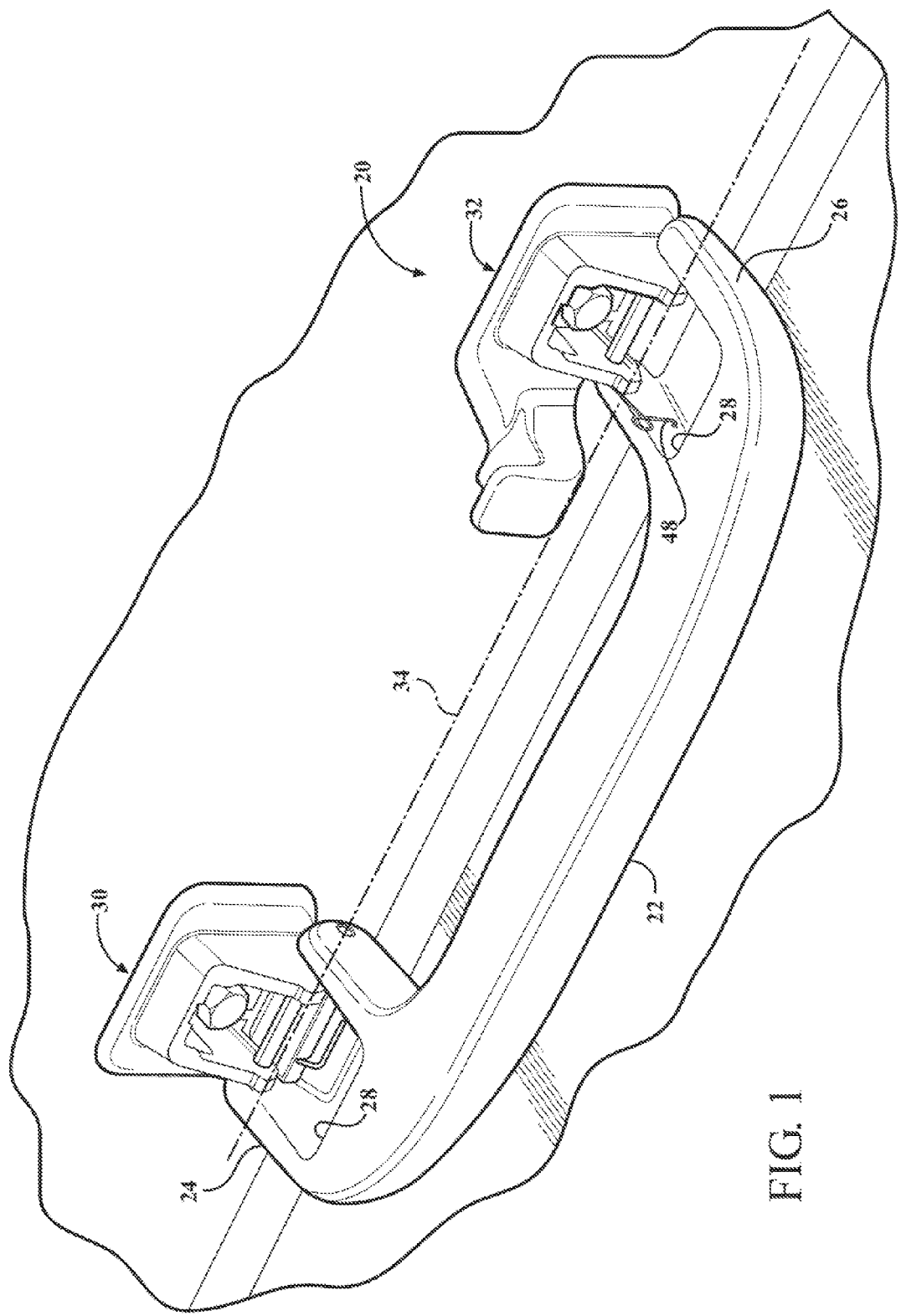
FIG. 1 is a perspective view of an assist handle assembly.
Figure 2:
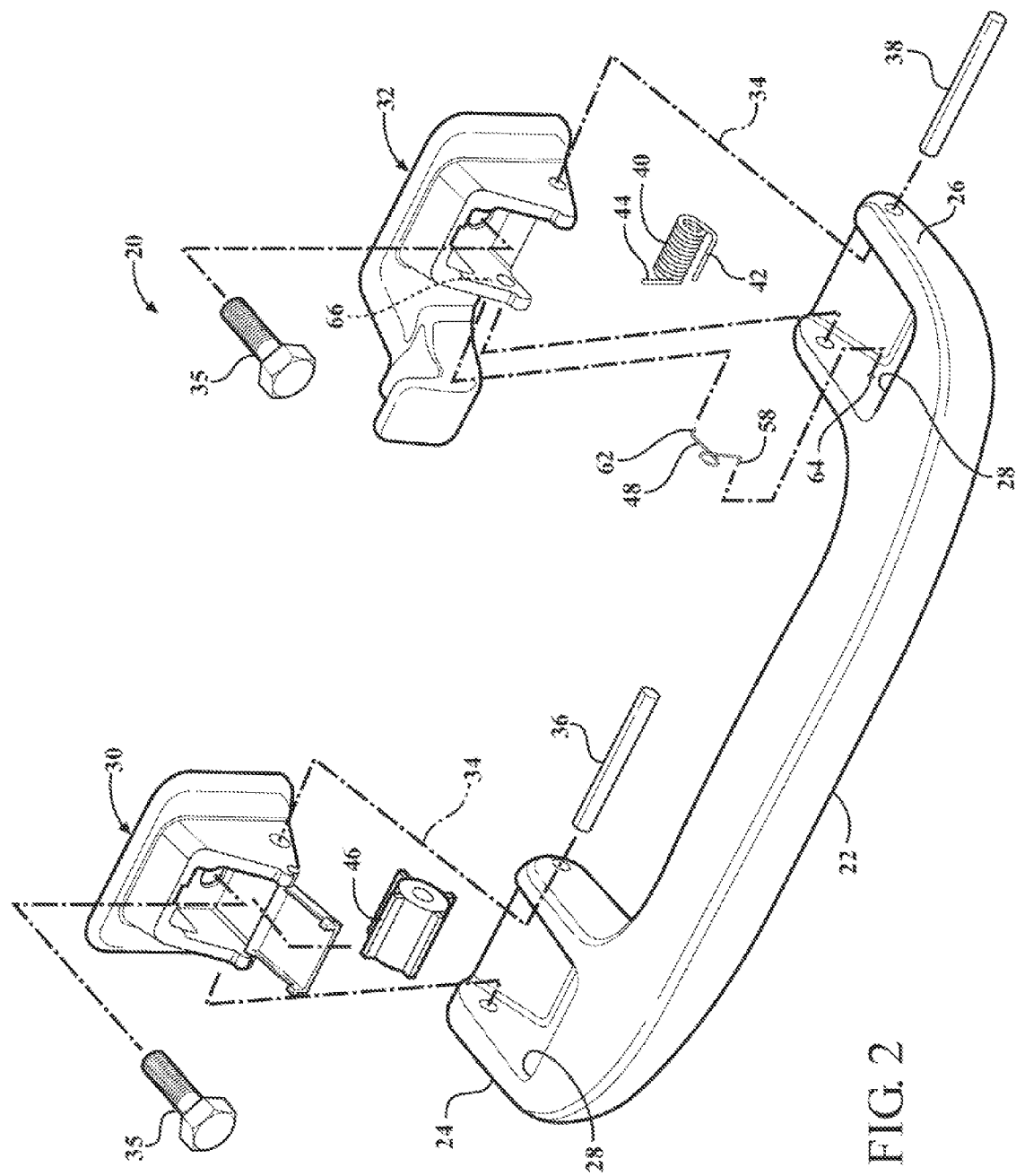
FIG. 2 is an exploded perspective view of the assist handle assembly.

Referring to FIGS. 1 and 2, the assist handle assembly 20 includes a body 22. The body 22 includes a first end portion 24 and a second end portion 26. The first end portion 24 and the second end portion 26 are disposed at opposite ends of the body 22 relative to each other, along a longitudinal axis of the body 22. The body 22, including the first end portion 24 and the second end portion 26, may be configured in any suitable manner to fit the vehicle and any ergonomic requirements. As shown, the body 22 includes a generally rounded rectangular cross section, with the first end portion 24 and the second end portion 26 extending laterally in a co-planar fashion from the body 22. As shown, the first end portion 24 and the second end portion 26 each include a pocket 28 for receiving therein and concealing from view various other components of the assist handle assembly 20. However, it should be appreciated that the first end portion 24 and the second end portion 26 may not include the pockets 28 shown.

The assist handle assembly 20 further includes a first hinge assembly 30 and a second hinge assembly 32. The first hinge assembly 30 is coupled to the first end portion 24. The second hinge assembly 32 is coupled to the second end portion 26. The first hinge assembly 30 and the second hinge assembly 32 rotatably support and attach the body 22 to the vehicle. The body 22 is rotatable between a stowed position and an open position about a pivot axis 34 relative to the first hinge assembly 30 and the second hinge assembly 32 respectively. The first hinge assembly 30 and the second hinge assembly 32 may be configured to attach the body 22 to the vehicle in any suitable manner. As shown, the first hinge assembly 30 and the second hinge assembly 32 each include a fastener 35 extending through a plate for threaded engagement with a structural member of the vehicle. However, it should be appreciated that the first hinge assembly 30 and the second hinge assembly 32 may be attached to the vehicle in some other manner not shown or described herein.

A first pin 36 extends through the first end portion 24 and the first hinge assembly 30 to rotatably couple the first hinge assembly 30 to the body 22. A second pin 38 extends through the second end portion 26 and the second hinge assembly 32 to rotatably couple the second hinge assembly 32 to the body 22. The first pin 36 and the second pin 38 are concentrically aligned along and cooperate with each other to define the pivot axis 34 about which the body 22 rotates relative to the first hinge assembly 30 and the second hinge assembly 32. It should be appreciated that the first hinge assembly 30 and the second hinge assembly 32 may be rotatably coupled to the first end portion 24 and the second end portion 26 in some other manner not shown or described herein.

As described above, the body 22 is rotatable about the pivot axis 34 between the stowed position (when not in use) and an open position. In use, the passenger grasps the body 22 when the body 22 is in the stowed position, and pulls on the body 22 to rotate the body 22 into the open position. Once in the open position, the passenger may pull on the body 22 to assist in ingress and egress from the vehicle. As described in greater detail below, once the passenger releases the body 22, the body 22 automatically returns to the stowed position.

The assist handle assembly 20 further includes a primary spring 40. The primary spring 40 interconnects the body 22 and one of the first hinge assembly 30 and the second hinge assembly 32. As shown, the primary spring 40 is disposed at the second end portion 26 of the body 22, and interconnects the body 22 and the second hinge assembly 32. However, it should be appreciated that the relative position of the primary spring 40 may be reversed so that the primary spring 40 is disposed at the first end portion 24 and interconnects the body 22 and the first hinge assembly 30. The primary spring 40 is configured for biasing the body 22 into the stowed position. As such, the primary spring 40 provides the primary impetus for the body 22 to return to the stowed position once the body 22 is released by the passenger.

The primary spring 40 may include any type and or size of spring suitable for use in the assist handle assembly 20, and may be configured in any suitable manner capable of biasing the body 22 from the open position into the stowed position. As shown, the primary spring 40 includes a torsion spring, which includes a first arm 42 configured for engaging the second end portion 26 of the body 22, and a second arm 44 configured for engaging second hinge assembly 32. Rotating the coil spring from the stowed position into the open position twists the coil spring, which thereby stores energy therein. Upon the passenger releasing the body 22, the coil spring uncoils back to an original position, thereby biasing the body 22 back to the stowed position.

The assist handle assembly 20 may further include a damper 46. The damper 46 interconnects the body 22 and one of the first hinge assembly 30 and the second hinge assembly 32. The damper 46 is configured for slowing rotation of the body 22. Preferably, the damper 46 provides increasing resistive torque with increasing speed of rotation of the body 22. Alternatively, the damper 46 may include a friction damper that absorbs energy and dampens vibration. As such, the damper 46 prevents the body 22 from rapidly "snapping" back into the stowed position when released by the passenger. The damper 46 may include any suitable type of damper 46, including but not limited to a hydraulic damper 46, capable of slowing movement of the body 22. As shown, the damper 46 is disposed adjacent the first end portion 24 of the body 22, at an opposite end of the body 22 from the primary spring 40. However, it should be appreciated that the relative positions of the damper 46 and the primary spring 40 may be reversed, with the primary spring 40 disposed at the first end portion 24 and the damper 46 disposed at the second end portion 26. It is also contemplated that the damper 46 and the primary spring 40 may both be disposed at either the first end portion 24 or the second end portion 26.

The assist handle assembly 20 further includes a secondary spring 48. The secondary spring 48 interconnects the body 22 and one of the first hinge assembly 30 and the second hinge assembly 32. As shown, the secondary spring 48 is disposed at the second end portion 26 of the body 22, and interconnects the body 22 and the second hinge assembly 32. However, it should be appreciated that the relative position of the secondary spring 48 may be reversed so that the secondary spring 48 is disposed at the first end portion 24 and interconnects he body 22 and the first hinge assembly 30. Additionally, while the secondary spring 48 is shown adjacent the primary spring 40, it should be appreciated that the secondary spring 48 may be disposed at opposite ends of the body 22 relative to the primary spring 40, e.g., the primary spring 40 may be disposed at the second end portion 26 and the secondary spring 48 may be disposed at the first end portion 24.

Figure 3:
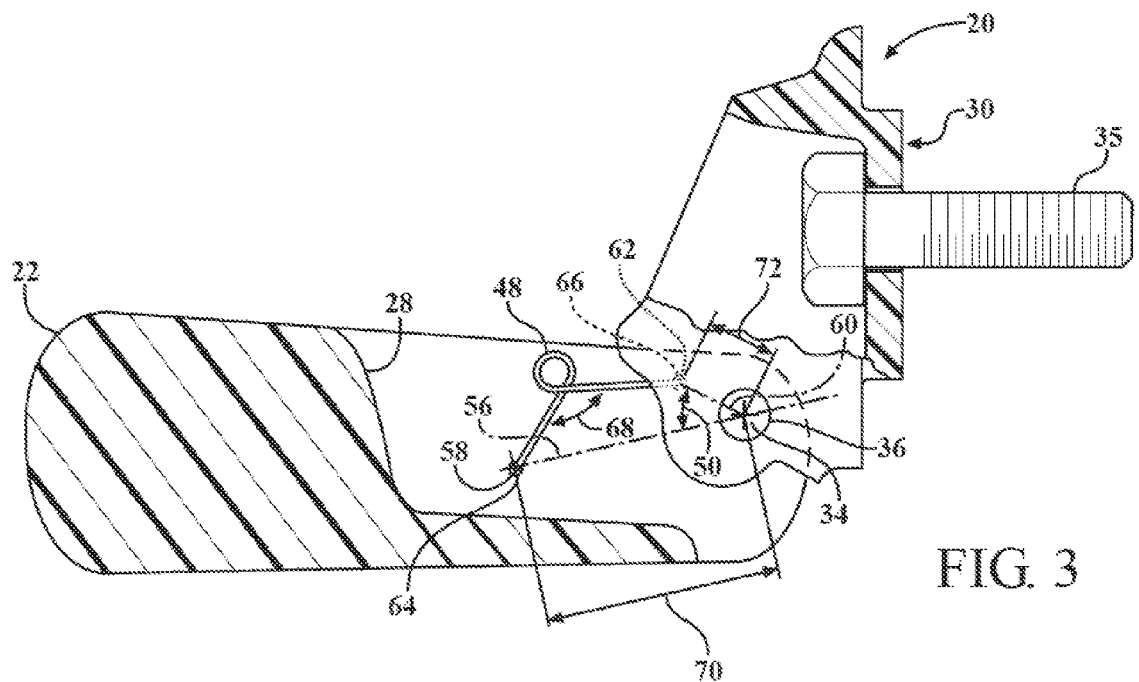
FIG. 3 is a schematic side cross sectional view of the assist handle assembly in an open position.
Figure 4:
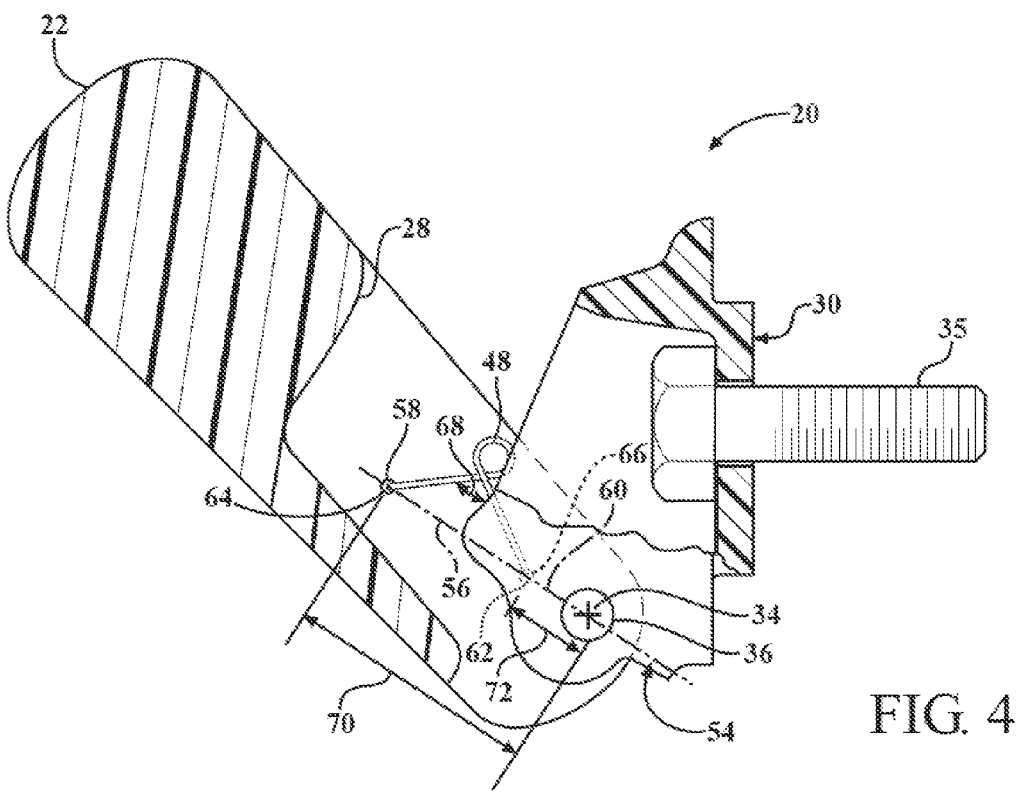
FIG. 4 is a schematic side cross sectional view of the assist handle assembly in an intermediate position.
Figure 5:
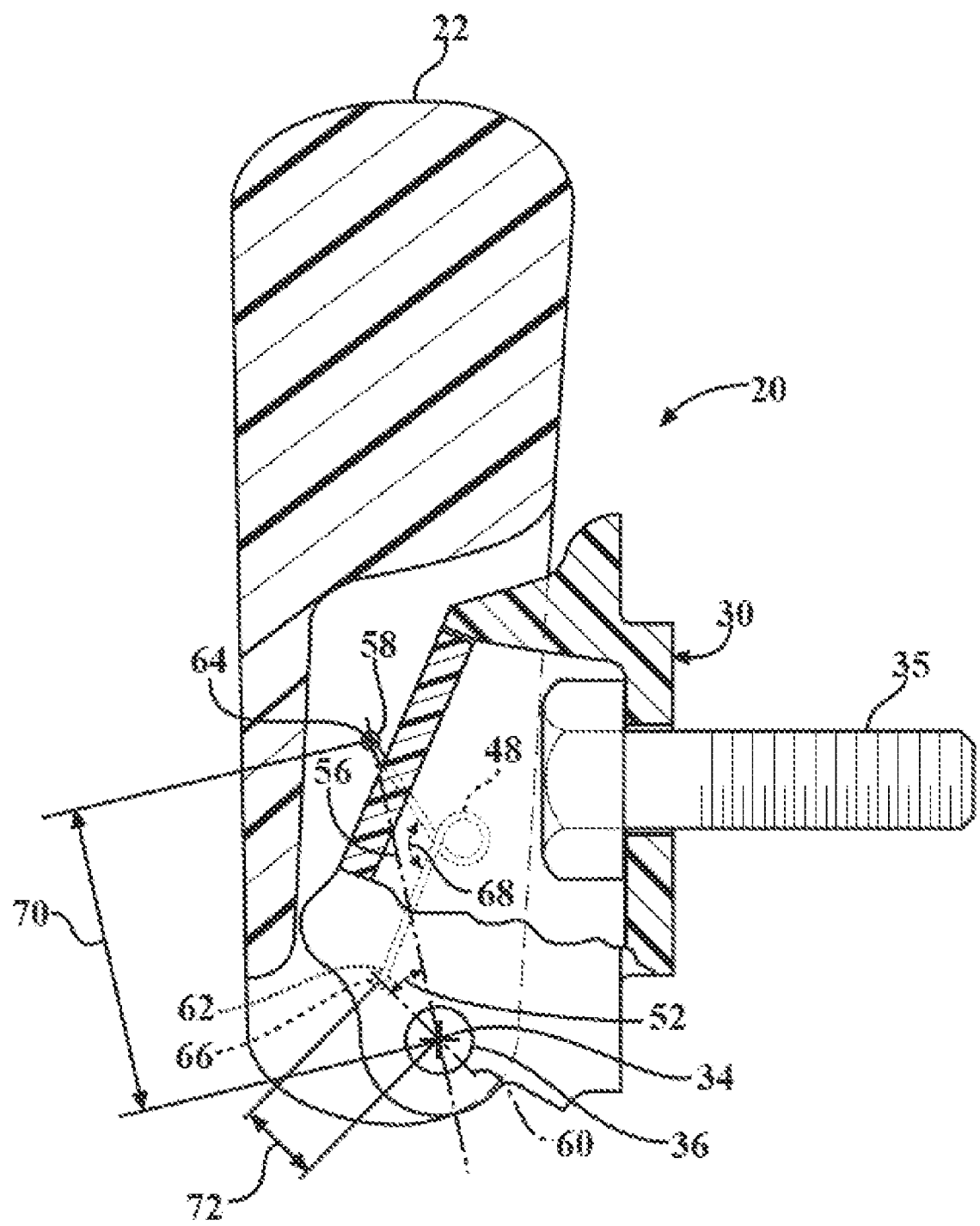
FIG. 5 is a schematic side cross sectional view of the assist handle assembly in a stowed position.

The secondary spring 48 moves with the body 22 as the body 22 moves between the open position and the stowed position. Referring to FIGS. 3 through 5, the open position is shown in FIG. 3, an intermediate position is shown in FIG. 4 and the stowed position is shown in FIG. 5. Specifically, the secondary spring 48 includes a first range of motion 50 and a second range of motion 52 when moving between the open position and the stowed position. The secondary spring 48 includes an intermediate position 54 at the point of travel where the secondary spring 48 passes between the first range of motion 50 and the second range of motion 52. Particularly, the first range of motion 50 is associated with movement of the body 22 when nearer the open position, and the second range of motion 52 is associated with movement of the body 22 when nearer the stowed position. Accordingly, the first range of motion 50 is associated with and includes rotation of the body 22 between the open position and the intermediate position 54, which is disposed between the open position and the stowed position. The second range of motion 52 is associated with and includes rotation of the body 22 between the stowed position and the intermediate position 54. The intermediate position 54 is the position of the secondary spring 48 when an imaginary line 56 extending between a first end 58 of the secondary spring 48 and the pivot axis 34 is aligned and parallel with an imaginary line 60 extending from a second end 62 of the secondary spring 48 and the pivot axis 34.

The secondary spring 48 is configured for biasing the body 22 into the open position when the body 22 is disposed within the first range of motion 50, and is also configured for biasing the body 22 into the stowed position when the body 22 is disposed within the second range of motion 52. Accordingly, when the body 22 is moving within the first range of motion 50, the secondary spring 48 biases against the primary spring 40 to resist movement of the body 22 from the open position into the intermediates position and into the stowed position. When the body 22 is moving within the secondary range of motion, the secondary spring 48 biases with the primary spring 40 to assist movement of the body 22 from the intermediate position 54 into the stowed position. The secondary spring 48 switches from resisting movement of the primary spring 40 to assisting movement of the primary spring 40 at the intermediate position 54.

As shown, the secondary spring 48 includes a scissor spring. However, it should be appreciated that the secondary spring 48 may include some other type and/or style of spring that is capable of biasing the body 22 into the open position when the body 22 is moving within the first range of motion 50 and biasing the body 22 into the stowed position when the body 22 is moving within the second range of motion 52. As noted above, the secondary spring 48 includes a first end 58 and a second end 62. The first end 58 is attached to the body 22. The second end 62 is attached to one of the first hinge assembly 30 and the second hinge assembly 32. As shown in FIG. 1, the secondary spring 48 is disposed at the first end portion 24 of the body 22, with the second end 62 of the secondary spring 48 attached to the first hinge assembly 30. As shown in FIG. 2, the secondary spring 48 is disposed at the second end portion 26 of the body 22, with the second end 62 of the secondary spring 48 attached to the second hinge assembly 32. The body 22 defines a first pocket 64 for receiving the first end 58 of the secondary spring 48 therein to attach and secure the first end 58 of the secondary spring 48 relative to the body 22. One of the first hinge assembly 30 and the second hinge assembly 32 defines a second pocket 66 for receiving the second end 62 of the secondary spring 48 therein to attach and secure the first end 58 of the spring relative to one of the first hinge assembly 30 or the second hinge assembly 32. As shown in FIG. 1, the first end portion 24 of the body 22 defines the first pocket 64, and the first hinge assembly 30 defines the second pocket 66. As shown in FIG. 2, the second end portion 26 of the body 22 defines the first pocket 64, and the second hinge assembly 32 defines the second pocket 66.

Preferably, the first end 58 of the secondary spring 48 is spaced from the pivot axis 34 a distance 70 equal to twenty five millimeters (25 mm), and the second end 62 of the secondary spring 48 is spaced from the pivot axis 34 a distance 72 equal to ten millimeters (10 mm). However, it should be appreciated that the first end 58 and the second end 62 of the secondary spring 48 may be spaced from the pivot axis 34 distances other than shown and described herein. The secondary spring 48 includes a spring angle 68, i.e., the angle between the first end 58 and the second end 62 of the secondary spring 48, of one hundred twenty degrees (120°) when the body 22 and the secondary spring 48 are in the open position. The secondary spring 48 includes a spring angle 68 of seventy two degrees (72°) when the body 22 and the secondary spring 48 are in the stowed position.

The secondary spring 48 compresses as the secondary spring 48 and the body 22 rotate from the open position toward the intermediate position 54 to resist movement of the body 22 toward the stowed position. Furthermore, the secondary spring 48 expands as the secondary spring 48 and the body 22 rotate from the intermediate position 54 toward the stowed position to assist movement of the body 22 toward the stowed position. It should be appreciated that the second end 62 of the secondary spring 48 rotates about the pivot axis 34 with the body 22. When the secondary spring 48 reaches the intermediate position 54, the secondary spring 48 goes "over-center", at which point the secondary spring 48 changes from compression to expansion, thereby providing the ability for the secondary spring 48 to bias the body 22 into the open position when the body 22 is moving within the first range of motion 50, and bias the body 22 into the stowed position when the body 22 is moving within the second range of motion 52. Accordingly, the second end 62 of the secondary spring 48 acts on an off-center pivot relative to the second hinge assembly 32, going over center at the intermediate position 54. Alternatively, it should be appreciated that the positions of the first end 58 and the second 62 end of the secondary spring 48 relative to the pivot axis 34 may be reversed, such that it is the first end 58 that acts on the off-center pivot relative to the second hinge assembly 32 to go over center at the intermediate position 54.

The primary spring 40 and the damper 46 are each sized so that the primary spring 40 provides a closing force just above that required to move the body 22 into the stowed position against the damper 46 when near the stowed position. However, the additional force provided by the secondary spring 48 assists the closing force provided by the primary spring 40 to ensure complete movement of the body 22 into the stowed position. Because the primary spring 40, when sized to provide the closing force just above that required to move the body 22 into the stowed position when near the stowed position may include an excessive closing force when near the open position, the secondary spring 48 resists rotation of the body 22 during the first range of motion 50 to slow the closing of the handle. As such, the secondary handle provides a constant velocity movement of the handle between the open position and the stowed position. For example, the primary spring 40 may be sized to provide approximately 110 Nmm of torque when in the open position and 55 Nmm of torque when in the stowed position, whereas the secondary spring 48 may be sized to provide 30 Nmm of torque when in both the open position and the closed position to provide an overall spring torque of 85 Nmm when in both the open position and the stowed position.

While the best modes for carrying out the invention have been described in detail, those familiar with the art to which this invention relates will recognize various alternative designs and embodiments for practicing the invention within the scope of the appended claims.

The invention claimed is:

1. An assist handle assembly for a vehicle, the assist handle assembly comprising:
   a body;
   a first hinge assembly coupled to said body, with said body rotatable between a stowed position and an open position about a pivot axis relative to said first hinge assembly;
   a primary spring interconnecting said body and said first hinge assembly and configured for biasing said body into said stowed position; and
   a secondary spring interconnecting said body and said first hinge assembly and configured for biasing said body into said open position when said body is disposed within a first range of motion between said stowed position and said open position, and configured for biasing said body into said stowed position when said body is disposed within a second range of motion between said stowed position and said open position.

2. An assist handle assembly as set forth in claim 1 wherein said first range of motion includes rotation of said body between said open position and an intermediate position disposed between said open position and said stowed position, and said second range of motion includes rotation of said body between said stowed position and said intermediate position.

3. An assist handle assembly as set forth in claim 2 wherein said secondary spring biases against said primary spring during said first range of motion to resist rotation of said body from said open position into said intermediate position, and biases with said primary spring during said second range of motion to assist rotation of said body from said intermediate position into said stowed position.

4. An assist handle assembly as set forth in claim 3 wherein said secondary spring includes a first end attached to said body and a second end attached to said first hinge assembly.

5. An assist handle assembly as set forth in claim 4 wherein said body defines a first pocket for receiving said first end of said secondary spring therein, and wherein said first hinge assembly defines a second pocket for receiving said second end of said secondary spring therein.

6. An assist handle assembly as set forth in claim 4 wherein said secondary spring includes a scissor spring.

7. An assist handle assembly as set forth in claim 6 wherein said first end of said secondary spring is spaced from said pivot axis a distance equal to twenty five millimeters (25 mm), and said second end of said secondary spring is spaced from said pivot axis a distance equal to ten millimeters (10 mm).

8. An assist handle assembly as set forth in claim 7 wherein said secondary spring includes a spring angle of one hundred twenty degrees (120°) when said body is in said open position, and a spring angle of seventy two degrees (72°) when said body is in said stowed position.

9. An assist handle assembly as set forth in claim 1 wherein a first pin rotatably couples said first hinge assembly to said body, with said first pin concentrically aligned along said pivot axis.

10. An assist handle assembly for a vehicle, the assist handle assembly comprising:
    a body having a first end portion and a second end portion disposed at opposite ends of said body;
    a first hinge assembly coupled to said first end portion and a second hinge assembly coupled to said second end portion, with said body rotatable between a stowed position and an open position about a pivot axis relative to said first hinge assembly and said second hinge assembly;
    a primary spring interconnecting said body and one of said first hinge assembly and said second hinge assembly and configured for biasing said body into said stowed position; and
    a secondary spring interconnecting said body and one of said first hinge assembly and said second hinge assembly and configured for biasing said body into said open position when said body is disposed within a first range of motion between said stowed position and said open position, and configured for biasing said body into said stowed position when said body is disposed within a second range of motion between said stowed position and said open position.

11. An assist handle assembly as set forth in claim 10 wherein said first range of motion includes rotation of said body between said open position and an intermediate position disposed between said open position and said stowed position, and said second range of motion includes rotation of said body between said stowed position and said intermediate position.

12. An assist handle assembly as set forth in claim 11 wherein said secondary spring biases against said primary spring during said first range of motion to resist rotation of said body from said open position into said intermediate position, and biases with said primary spring during said second range of motion to assist rotation of said body from said intermediate position into said stowed position.

13. An assist handle assembly as set forth in claim 12 wherein said secondary spring includes a first end attached to said body and a second end attached to one of said first hinge assembly and said second hinge assembly.

14. An assist handle assembly as set forth in claim 13 wherein said body defines a first pocket for receiving said first end of said secondary spring therein, and wherein one of said first hinge assembly and said second hinge assembly defines a second pocket for receiving said second end of said secondary spring therein.

15. An assist handle assembly as set forth in claim 13 wherein said secondary spring includes a scissor spring.

16. An assist handle assembly as set forth in claim 15 wherein said first end of said secondary spring is spaced from said pivot axis a distance equal to twenty five millimeters (25 mm), and said second end of said secondary spring is spaced from said pivot axis a distance equal to ten millimeters (10 mm).

17. An assist handle assembly as set forth in claim 16 wherein said secondary spring includes a spring angle of one hundred twenty degrees (120°) when said body is in said open position, and a spring angle of seventy two degrees (72°) when said body is in said stowed position.

18. An assist handle assembly as set forth in claim 10 further including a damper interconnecting said body and one of said first hinge assembly and said second hinge assembly and configured for slowing rotation of said body.

19. An assist handle assembly as set forth in claim 10 wherein a first pin rotatably couples said first hinge assembly to said body, and a second pin rotatably couples said second hinge assembly to said body, with said first pin and said second pin concentrically aligned along said pivot axis.

20. An assist handle assembly for a vehicle, the assist handle assembly comprising:
   a body having a first end portion and a second end portion disposed at opposite ends of said body;
   a first hinge assembly coupled to said first end portion and a second hinge assembly coupled to said second end portion, with said body rotatable between a stowed position and an open position about a pivot axis relative to said first hinge assembly and said second hinge assembly;
   a damper interconnecting said body and one of said first hinge assembly and said second hinge assembly and configured for slowing rotation of said body;
   a primary spring interconnecting said body and one of said first hinge assembly and said second hinge assembly and configured for biasing said body into said stowed position, wherein said primary spring includes a torsion spring; and
   a secondary spring interconnecting said body and one of said first hinge assembly and said second hinge assembly and configured for biasing said body into said open position when said body is disposed within a first range of motion between said stowed position and said open position, and configured for biasing said body into said stowed position when said body is disposed within a second range of motion between said stowed position and said open position;
   wherein said first range of motion includes rotation of said body between said open position and an intermediate position disposed between said open position and said stowed position, and said second range of motion includes rotation of said body between said stowed position and said intermediate position, with said secondary spring biasing against said primary spring during said first range of motion to resist rotation of said body from said open position into said intermediate position, and said secondary spring biasing with said primary spring during said second range of motion to assist rotation of said body from said intermediate position into said stowed position;
   wherein said secondary spring includes a scissor spring having a first end attached to said body and a second end attached to one of said first hinge assembly and said second hinge assembly.

* * * * *